United States Patent [19]

Giersberg et al.

[11] Patent Number: 5,246,623
[45] Date of Patent: Sep. 21, 1993

[54] METHOD FOR THE PREPARATION OF ELECTRICALLY CONDUCTIVE TIN-IV-OXIDE OF FINE-PARTICLE SIZE AND THE USE OF TIN-IV-OXIDE AS FILLER AND PIGMENT

[75] Inventors: Joachim Giersberg, Marl-Sinsen; Astrid Klapdor, Essen, both of Fed. Rep. of Germany

[73] Assignee: Th. Goldschmidt AG, Essen, Fed. Rep. of Germany

[21] Appl. No.: 934,991

[22] Filed: Aug. 25, 1992

[30] Foreign Application Priority Data

Sep. 6, 1991 [DE] Fed. Rep. of Germany ....... 4129611

[51] Int. Cl.$^5$ .............................................. H01B 1/06
[52] U.S. Cl. .................................... 252/518; 106/401; 423/618
[58] Field of Search ....................... 252/518; 106/401; 423/464, 494, 618

[56] References Cited

U.S. PATENT DOCUMENTS

| 5,032,319 | 7/1991 | Ruf | 252/518 |
| 5,085,805 | 2/1992 | Ruf | 252/518 |
| 5,116,468 | 5/1992 | Giersberg et al. | 204/96 |

FOREIGN PATENT DOCUMENTS 1235968  9/1987  European Pat. Off. .
4034353 12/1991  Fed. Rep. of Germany .

Primary Examiner—Mark L. Bell
Assistant Examiner—Chris Gallo
Attorney, Agent, or Firm—Akoo-Toren

[57] ABSTRACT

A method for the production of electrically conductive tin-IV-oxide of fine particle size is disclosed. Pursuant to the method, tin oxide and/or tin oxide hydrate is precipitated on a dihydroxy-tin-dichloride solution containing fluoride ions as doping agents. The precipitation is accomplished by adding alkali metal hydroxide, ammonium hydroxide, alkali metal carbonate or ammonium carbonate and the tin oxide and/or tin oxide hydrate is separated from the aqueous medium. The separated product is then calcined. The invention also discloses the use of the fluoride-doped tin-IV-oxide by adding it to the various vehicles.

3 Claims, No Drawings

5,246,623

METHOD FOR THE PREPARATION OF ELECTRICALLY CONDUCTIVE TIN-IV-OXIDE OF FINE-PARTICLE SIZE AND THE USE OF TIN-IV-OXIDE AS FILLER AND PIGMENT

FIELD OF INVENTION

The invention generally relates to tin-IV-oxide and is particularly directed to a method for the production of electrically conductive tin-IV-oxide of fine-particle size by precipitation of tin oxide and/or tin-oxide hydrate from a solution of salt of tetravalent tin in a polar organic solvent or water or a mixture of a polar organic solvent with water in the presence of effective amounts of a fluoride-containing doping agent.

Considered from another aspect, the invention is directed to the use of tin-IV-oxide prepared pursuant to the inventive method as filler or pigment in plastics, lacquer, varnishes, paints, paper, textiles, toners and the like.

BACKGROUND INFORMATION AND PRIOR ART

It has been known for a long time to apply electrically conductive and infrared-reflecting tin oxide layers on substrates, particularly glass. In many instances, the preparation of such electrically conductive and infrared reflecting tin-oxide layers is applied to glass by pyrolytic decomposition of liquid preparations which contain essentially one or several tin-based compounds and one or several suitable fluoride-containing doping compounds.

The electrical conductivity is produced by defective areas or regions in the respective tin-oxide layers; such defective areas largely being formed by the added doping agent. In this way, slightly below the conduction band terms of defective areas (or centers of disturbances) or donor terms, respectively, are produced from which, if necessary, with a slight expenditure of energy, electrons can be brought into the conduction band. This is, however, not the case with pure, undoped tin oxide due to the forbidden zone between valence band and conduction band.

Regarding the electrical conductivity or anti-static adjustment of different solid and liquid technical products, such as for example plastics, lacquers, paints, papers, toners and textiles, electrically conductive pigments are necessary to accomplish this task. In addition to metal powders and graphite which necessarily cause a dark colorization of such technical products, powder-shaped semiconductors are often used. In so doing, it is desirable to be able to use semiconductor pigments of high electrical conductivity or low specific resistance which range in color from as white as possible to light-colored and having a small grain size.

In EP-A-0235 968, a transparent, aqueous solution containing a tin compound is disclosed. This solution is obtained by reaction of tin carboxylate, particularly tin oxalate, with hydrogen peroxide in the ratio 1:1.5 or more in an aqueous medium. In this procedure, a doping agent may be contained in the reaction system in an amount of 0.01 to 0.35 mole per mole of tin caboxylate. This transparent aqueous solution is calcined above 400° C.

However, this procedure is not satisfactory in every respect. The tin-II-oxalate which is preferably used as a starting product in the above procedure must first be produced from metallic tin or a tin-II-compound. Tin-II-oxalate, however, is soluble in water with difficulty only, so that the oxidation with $H_2O_2$ in an aqueous medium proceeds in a heterogeneous phase.

In order to overcome these disadvantages, it is proposed in the German patent 40 34 353 to prepare the required tin-IV-oxalate solution in the first stage by electrolysis of an aqueous oxalic-acid solution by using anodes of tin or tin-containing alloys.

If tin-IV-oxide or the corresponding tin-IV-oxide hydrate is precipitated from these solutions, for example, by adding alkali hydroxide or ammonium hydroxide, then oxalate-containing waste waters are obtained which must be disposed of in an environmentally-acceptable way. If the above-mentioned suspensions are dehydrated by spray drying, then tin-IV-oxide is obtained in a predominantly spherical form. From an application technical point of view, however, it is desirable to obtain particles of amorphous tin-IV-oxide in a shape which can be varied to suit a particular purpose.

OBJECT OF THE INVENTION

The present invention is concerned with the technical problem to provide a method pursuant to which it is possible to prepare a fluoride-doped, light-colored tin-IV-oxide of optimum conductivity and having the desired particle size and particle form with grain distribution which is largely homogenous.

Accordingly, the primary object of the present invention is to provide a method for the preparation of such tin-IV-oxide.

It is another object of the invention to provide tin-IV-oxide of suitable particle size and particle form which lends itself for use as pigment or filler in plastics, lacquers, varnishes, paints, paper, textiles, toners and the like.

Generally it is an object of the invention to improve on the art of tin-IV-oxide as previously practiced.

SUMMARY OF THE INVENTION

Pursuant to the invention, tin oxide and/or tin oxide hydrate is precipitated from an aqueous dihydroxy-tin dichloride solution containing the doping agent. Precipitation is accomplished by adding to the solution alkali metal- or ammonium hydroxide, or alkali metal- or ammonium carbonate. The precipitate is then separated from the aqueous medium, and the separated product is calcined in known manner.

The solutions of $(OH)_2SnCl_2$ in a polar solvent such as alcohol, aldehyde, ketones, esters, or ethers are readily prepared by oxidation of dissolved tin-II-chloride (anhydrous) with a hydrogen peroxide. In so doing, the organic solvents, particularly alcohol, are used in order to prevent colloidal precipitates and also to inhibit crystal growth.

Aqueous solutions of $(OH)_2SnCl_2$ can be had in high concentration by, preferably, electrolytic oxidation of aqueous solutions of tin-II-chloride. The solutions are stable against hydrolysis. They do not require any stabilization by addition of HCl.

No precipitates can be observed even if the solution are permitted to stand for a long period of time. A thickened, highly concentrated solution can again be diluted to the required concentration for use without any difficulty. The ratio Sn:Cl amounts to 1:2 so that the waste water or emission problems can be kept relatively low.

If one precipitates from these solutions the tin-IV-oxide and/or tin-IV-oxide hydrate by reaction with alkali metal- or ammonium hydroxide or -carbonates, then the waste water to be disposed of contains only alkali metal or ammonium chlorides, and the favorable ratio of 1 atom tin:2 atom chloride is of additional advantage.

HF, $SnF_2$, $(HO)_2SnF_2$, ammonium fluoride and alkali metal fluoride are usable as the doping agent in a manner well documented in the literature. The amount of doping agents is advantageously chosen in such manner that during the doping process a ratio of tin:fluoride of 1:0.2 to 0.6, particularly of 1:0.3 to 0.4, is present.

The method can be carried out in such a manner as to proceed from the $(HO)_2SnCl_2$ solution or the precipitants. Preferably, however, the solution of the tin salt is added dropwise to the solution of the precipitant. In doing so, it is advantageous to agitate the reaction mixture intensively. Depending on the speed of the addition, the temperature of the aqueous solutions and the intensity of the agitation, the shape and size of the particles of the precipitated tin-IV-oxide can be largely influenced in the desired manner. The influencing of the parameter by the kind and manner of the precipitation are well known to one skilled in the art from general chemical application technology.

The doping agent may be added at the time of the preparation of the dihydroxy-tin-chloride. However, it should be present in the solution of the tin salt prior to the actual precipitation reaction.

The filtration of the precipitated tin-IV-oxide and/or oxide hydrate normally do not cause any difficulties. The addition of filter auxiliaries consisting of cellulose fibers, such as filter cotton, may increase the speed of the filtration. In so doing it has surprisingly been shown that the conductivity of the ultimate product is increased if the filter auxiliary is left behind in the product and the calcination is carried out without prior removal of the filter auxiliary. In this manner, the conductivity of the tin-IV-oxide is further increased. The effect of the filter cotton is demonstrated by the following representation of the typical values of a comparison test.

| Filter Cotton addition in % by weight | Specific Resistance [$\Omega \cdot m$] |
| --- | --- |
| 0 | $270 \cdot 10^3$ |
| 1.2 | 150 |
| 2.0 | 24 |
| 2.1 | 16 |

It may therefore be very much of advantage to add larger amounts of filter auxiliaries than are necessary for increasing the filtration speed. If the product can be readily filtered also in the absence of filter auxiliaries, then the filter auxiliaries may be added to the product immediately prior to the calcination. The filter residue is washed so as to be largely free of chlorine (residual chlorine content <1% by weight) and is thereafter dried in a careful manner. It is recommended to carry out a vacuum drying at 25° to 40° C. at the pressure of <0.5 mbar.

The calcination takes place within a temperature range of 300° to 600° C., preferably 400° to 550° C. After the optimum conductivity has been reached, the calcination is terminated. As a rule the calcination period is 30 to 90 minutes.

The doped tin-IV-oxide of fine particle-size obtained by the inventive procedure is superiorly suitable as filler or pigment in plastics, lacquers, varnishes, dyes, paints, paper, textiles and toners.

The invention will now be described in greater detail by the following examples, it being understood that the examples are given by way of illustration and not by way of limitation.

EXAMPLE 1

A 10% NaOH solution is added to a solution of 1 mole $(HO)_2SnCl_2$ and 0.15 mole of (HO (solid content=10%). The addition of the NaOH solution is performed under intense agitation until a pH value of 7 is measured. The time for adding the NaOH solution amounts to about 2 hours. The temperature during the entire addition time is kept constant at 20° C. To the suspension that is obtained is added 1.2% by weight (calculatorily determined filtration residue, anhydrous) of filtration cotton. This cotton is commercially available under the designation Schleicher & Scholl, No. 122. The cotton is distributed by thoroughly stirring the mixture. The suspension is then subjected to filtration and the filter cake is washed with an HF-containing aqueous solution (flourine content 200 ppm) until the suspension is essentially free of chloride (residual chlorine content <1.0 % by weight). The filter cake is then dried in vacuum at 40° C. and 0.3 mbar and subsequently calcined a 500° C. for 25 minutes.

The resulting powder has the following identifying data:

L value=78
specific surface=55 $m^2/g$ (BET)
specific resistance=150$\Omega \cdot m$

EXAMPLE 2

The procedure of Example 1 is repeated, however the NaOH-solution is used as starting solution and the precipitation is terminated when pH value of 1 has been reached.

The resulting powder has the following identifying data:

L value=72
specific surface=59 $m^2/g$ (BET)
specific resistance=21$\Omega \cdot m$

EXAMPLE 3

The procedure of Example 1 is repeated, however, precipitation temperature of 80° C. is maintained.

The resulting powder has the following identifying data:

L value=70
specific surface=77 $m^2/g$ (BET)
specific resistance=92$\Omega \cdot m$

EXAMPLE 4

The procedure of Example 3 is repeated, however, the dried but not yet calcined crude product is mixed with changing quantities of filter cotton of the previously-mentioned type and is then calcined pursuant to the procedure of Example 3.

The resulting powder has the following identifying data:

| Identifying data | Addition of filter cotton % by weight | | | |
| --- | --- | --- | --- | --- |
|  | 0.5 | 1.0 | 2.0 | 5.0 |
| L value | 77 | 77 | 77 | 69 |
| specific surface | 47 | 49 | 49 | 37 |

-continued

| Identifying data | Addition of filter cotton % by weight | | | |
|---|---|---|---|---|
| | 0.5 | 1.0 | 2.0 | 5.0 |
| m²/g (BET) specific resistance Ω · m | 24 | 16 | 16 | 27 |

EXAMPLE 5

The starting solution is a 10% aqueous NH3 solution with a temperature of 50° C. into which is dropped a 10% solution of $(HO)_2SnCl_2$ containing a doping agent HF (mole ratio Sn:F = 1:0.36). The dropwise addition is performed until a pH value of 2.0 has been obtained. During the procedure intense agitation is performed.

The processing is accomplished as in Example 1 and the addition of filter cotton as in Example 4.

The resulting powder has the following identifying data:

| Identifying data | Addition of filter cotton by % weight | |
|---|---|---|
| | 2.0 | 3.0 |
| L value | 68 | 66 |
| specific surface m²/g (BET) | 68 | 54 |

-continued

| Identifying data | Addition of filter cotton by % weight | |
|---|---|---|
| | 2.0 | 3.0 |
| specific resistance Ω · m | 14 | 11 |

We claim:
1. A method for the preparation of electrically conductive tin-IV-oxide of fine particle size, comprising
   a) adding a base to a salt of tetravalent tin dissolved in a solvent; said base being selected from the group consisting of alkali metal hydroxide, ammonium hydroxide, alkali metal carbonate and ammonium carbonate, said solvent being selected from the group consisting of a polar organic solvent, water and a mixture of both,
   b) precipitating tin oxide and/or tin oxide hydrate from the solvent by the said addition in the presence of a fluoride-containing doping agent,
   c) separating the precipitate from the solvent to obtain a product, and
   d) calcining the product.
2. The method according to claim 1, further comprising separating the precipitated tin oxide and/or tin oxide hydrate from the solvent by the use of a filter auxiliary comprising cellulose fibers to obtain a product, and calcining the product in the presence of the filter auxiliary.
3. The method according to claim 2, wherein the amount of the filter auxiliary is larger than required for obtaining an increase in the filtration velocity.

* * * * *